US010860516B2

United States Patent
Blaser

(10) Patent No.: US 10,860,516 B2
(45) Date of Patent: Dec. 8, 2020

(54) DOCKING SYSTEM FOR PORTABLE COMPUTING DEVICE

(71) Applicant: Mobile Tech, Inc., Lake Oswego, OR (US)

(72) Inventor: Robert Logan Blaser, Farmington, UT (US)

(73) Assignee: Mobile Tech, Inc., Hillsboro, OR (US)

( * ) Notice: Subject to any disclaimer, the term of this patent is extended or adjusted under 35 U.S.C. 154(b) by 0 days.

(21) Appl. No.: 16/142,503

(22) Filed: Sep. 26, 2018

(65) Prior Publication Data
US 2019/0188176 A1    Jun. 20, 2019

Related U.S. Application Data

(60) Provisional application No. 62/564,884, filed on Sep. 28, 2017, provisional application No. 62/594,344, filed on Dec. 4, 2017.

(51) Int. Cl.
| | |
|---|---|
| *G06F 13/40* | (2006.01) |
| *G07C 9/00* | (2020.01) |
| *G06F 13/42* | (2006.01) |
| *G06F 1/16* | (2006.01) |

(52) U.S. Cl.
CPC .......... *G06F 13/4081* (2013.01); *G06F 1/16* (2013.01); *G06F 1/1632* (2013.01); *G06F 1/1654* (2013.01); *G06F 13/4282* (2013.01); *G07C 9/00571* (2013.01); *G06F 2213/0042* (2013.01)

(58) Field of Classification Search
CPC ...... G06F 1/1632; G06F 13/4081; G06F 1/16; G06F 1/1654; G06F 13/4282; G07C 9/00571
See application file for complete search history.

(56) References Cited

U.S. PATENT DOCUMENTS

| | | | |
|---|---|---|---|
| 2004/0131086 A1* | 7/2004 | Alvarado ................ | G06F 8/65 370/487 |
| 2004/0190238 A1* | 9/2004 | Hubbard .............. | F16M 11/046 361/679.09 |
| 2010/0081473 A1* | 4/2010 | Chatterjee ............ | G06F 1/1632 455/559 |
| 2010/0083012 A1* | 4/2010 | Corbridge ............ | G06F 1/1632 713/300 |

(Continued)

OTHER PUBLICATIONS

International Search Report and Written Opinion for PCT/US2018/052934 dated Nov. 26, 2018.

*Primary Examiner* — Tim T Vo
*Assistant Examiner* — Phong H Dang

(57) ABSTRACT

Subject matter disclosed herein may generally relate to docking systems, and more particularly, to docking systems for portable computing devices such as, for example, tablet computing devices. The docking system may include (1) an enclosure for the portable computing device and (2) a base, where the enclosure can be docked to the base. A communication channel can be established between the portable computing device and the base via the enclosure and an electrical connection that exists when the enclosure is docked with the base. Through the communication channel, data such as credential data can be passed from the portable computing device to the base. The base can control whether the enclosure is permitted to be undocked from the base based on this credential data.

29 Claims, 13 Drawing Sheets

(56) References Cited

U.S. PATENT DOCUMENTS

| | | | |
|---|---|---|---|
| 2010/0084532 A1* | 4/2010 | Nielsen | F16L 1/11 |
| | | | 248/346.03 |
| 2010/0131691 A1 | 5/2010 | Chatterjee et al. | |
| 2012/0303851 A1* | 11/2012 | Tseng | G01C 21/265 |
| | | | 710/303 |
| 2014/0355200 A1* | 12/2014 | Thiers | H04W 88/02 |
| | | | 361/679.41 |
| 2015/0070832 A1* | 3/2015 | Schneider | G06F 1/1632 |
| | | | 361/679.41 |
| 2015/0185774 A1* | 7/2015 | Vroom | G06F 1/1632 |
| | | | 248/544 |
| 2017/0223167 A1* | 8/2017 | Zouaoui | H04M 1/72527 |
| 2019/0271719 A1* | 9/2019 | Sterzbach | G01R 1/045 |

\* cited by examiner

DOCKING SYSTEM FOR PORTABLE COMPUTING DEVICE

CROSS-REFERENCE AND PRIORITY CLAIM TO RELATED PATENT APPLICATIONS

This patent application claims priority to U.S. provisional patent application 62/564,884, filed Sep. 28, 2017, and entitled "Docking System Unlock for Portable Computing Device", the entire disclosure of which is incorporated herein by reference.

This patent application also claims priority to U.S. provisional patent application 62/594,344, filed Dec. 4, 2017, and entitled "Docking System Unlock for Portable Computing Device", the entire disclosure of which is incorporated herein by reference.

BACKGROUND

Field

Subject matter disclosed herein may generally relate to docking systems, and more particularly, to docking system unlock for portable computing devices such as, for example, tablet computing devices.

Introduction

As portable computing devices continue to increase in capability and functionality, deployment of portable computing devices in business offices, hospitals, industrial settings, and other types of environments, also continues to increase. In some instances, such as to assist in obtaining and/or maintaining an advantage over competitors, for example, a business may place a premium on obtaining the most capable and/or most up-to-date portable computing devices as soon as those devices become available. Thus, in addition to securing up-to-date portable computing devices, such as tablet computing devices, for example, a business may also obtain protective enclosures, such as cases that surround and safeguard portable computing devices. Such enclosures may reduce the likelihood of damage to the portable computing device in the event that the device is dropped, rained and/or spilled upon, and/or the like.

At times, portable computing devices may benefit from occasionally being connected to docking systems. For example, it may be advantageous to dock and/or attach a portable computing device, such as a tablet computing device, for example, to a battery charger to permit charging of an onboard battery. In other instances, it may be advantageous to establish a wired connection between a portable computing device and a particular network, such as to permit more secure communications that may be less vulnerable to surreptitious electronic eavesdropping of wireless signals, for example. However, typical docking systems impose numerous restrictions on various aspects of docking, utilization, operation, etc., of portable computing devices. These restrictions may, at times, be considered cumbersome and may diminish the appeal of particular types of portable computing devices.

Figure 1:
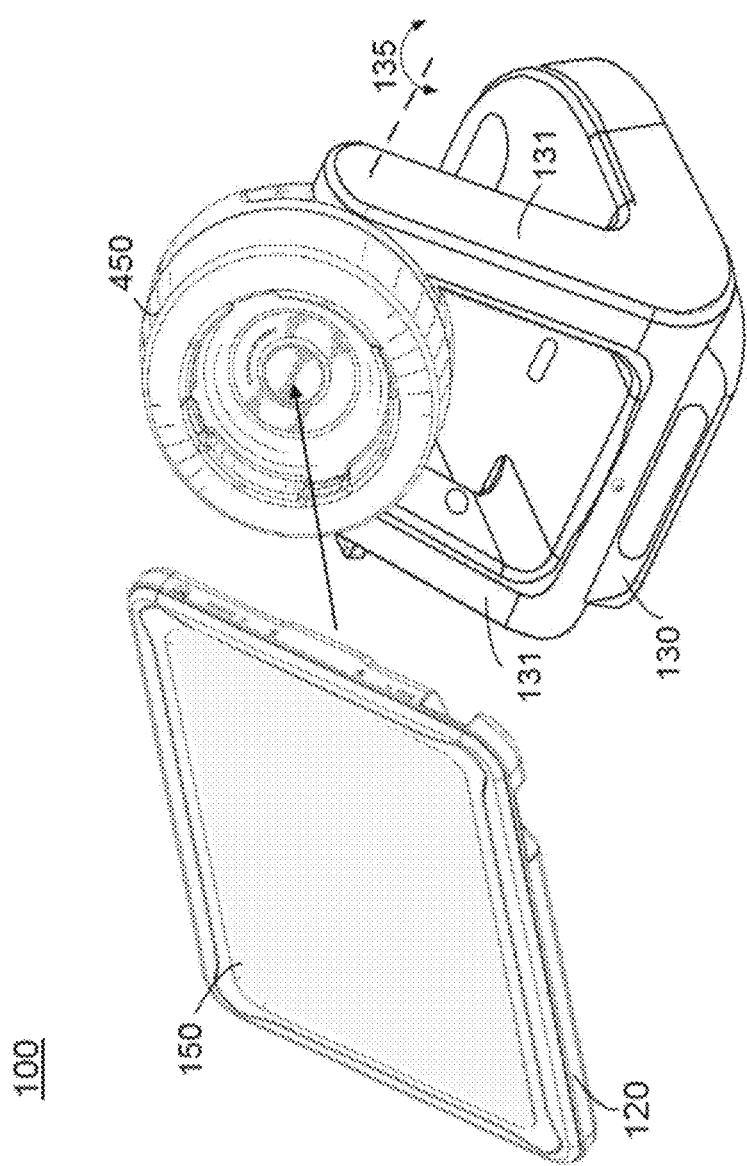
FIG. 1 is a perspective view of an implementation of an example docking system and/or docking arrangement including a portable computing device within an enclosure.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized.

DETAILED DESCRIPTION OF EXAMPLE EMBODIMENTS

As mentioned, as portable computing devices continue to increase in capability and functionality, deployment of portable computing devices in business offices, hospitals, industrial settings, and other types of environments, also continues to increase. In some instances, such as to assist in obtaining and/or maintaining an advantage over competitors, for example, a business may place a premium on obtaining the most capable and/or most up-to-date portable computing devices as soon as those devices become available. Thus, in addition to securing up-to-date portable computing devices, such as tablet computing devices, for example, a business may also obtain protective enclosures, such as cases that surround and safeguard portable computing devices. Such enclosures may reduce the likelihood of damage to the portable computing device in the event that the device is dropped, rained and/or spilled upon, and/or the like.

At times, portable computing devices may benefit from occasionally being connected to docking systems. For example, it may be advantageous to dock and/or attach a portable computing device, such as a tablet computing device, for example, to a battery charger to permit charging of an onboard battery. In other instances, it may be advantageous to establish a wired connection between a portable computing device and a particular network, such as to permit more secure communications that may be less vulnerable to surreptitious electronic eavesdropping of wireless signals, for example. However, typical docking systems impose numerous restrictions on various aspects of docking, utilization, operation, etc., of portable computing devices. These restrictions may, at times, be considered cumbersome and may diminish the appeal of particular types of portable computing devices.

Some example methods, apparatuses, and/or articles of manufacture are disclosed herein that may be used, in whole or in part, to facilitate and/or support one or more operations and/or techniques for a docking system for a portable computing device, such as implemented in connection with one or more computing and/or communication networks, devices, and/or protocols discussed herein, for example. As used herein, "portable computing device," "mobile device," "handheld device," and/or like terms may be used interchangeably and refer to any kind of special purpose computing platform and/or apparatus that may from time to time have a position or location that changes. In some instances, a portable computing device may, for example, be capable of communicating with other devices, mobile and/or otherwise, through wireless transmission or receipt of information according to one or more communication protocols. As a way of illustration, special purpose portable computing devices may include, for example, cellular telephones, smart telephones, personal digital assistants (PDAs), laptop computers, personal entertainment systems, gaming devices, tablet personal computers (PC), personal audio and/or video devices, personal navigation devices, and/or the like. It should be appreciated, however, that these are merely examples of portable computing devices that may be used, at least in part, to implement one or more operations and/or techniques for a docking system.

As alluded to previously, portable computing devices, such as tablet computing devices, for example, may be protected from damage via placement of a computing device within an enclosure while the device is deployed in an operational environment. Operational environments may include, but are not limited to, offices, hospitals, industrial and/or administrative settings, business establishments, as well as a wide variety of other types of environments, virtually without limitation. Thus, in many instances, a portable computing device operating within a protective enclosure may comprise a particularly effective workplace tool due, at least in part, to its ability to provide instantaneous computing power to numerous situations. However, a need to occasionally dock and/or unlock and/or undock a portable computing device, while within a protective enclosure, may represent a drawback to the convenience associated with utilizing such computing devices.

For example, in a factory environment, a portable computing device may be utilized to allow a user, such as a factory equipment operator, to enter a number of parameters collected at various locations within the factory. At times, the user may dock and/or return the portable computing device to a docking system to permit collected parameters to be processed by, for example, more capable, fixed computing stations, such as a mainframe server, for example. However, if the user is required to interact with the portable computing device while the device is connected to a docking system, certain manipulations of the portable computing device may not be easily accomplished. For example, if a user selects to display content, such as parameters, forms, etc., utilizing a first display mode, such as a landscape mode, transition to a second display mode, such as to a portrait mode, may involve reorienting and/or rearranging hardwired connections, for example.

Another example may relate to a use of portable computing devices operating as point-of-sale terminals in a retail setting. In such instances, one or more retail staff members may, for example, be required to periodically remove portable computing devices from order counters and/or other forward areas of the retail establishment so that the portable computing devices can be securely stored at the close of a business day. However, users may determine that removal of portable computing devices from protective enclosures, as well as detaching chip and pin readers and/or other ancillary devices from the portable computing device, comprises a burdensome and/or time-consuming task. Additionally, such attaching and reattaching of ancillary devices, as well as charging devices, which may occur several times per day, may give rise to undue deterioration of device connectors, receptacles, cables, etc.

Further, portable computing devices operating in retail environments, for example, may be vulnerable to theft by unruly and/or unscrupulous individuals. Thus, a retail business owner and/or other personnel, for example, may secure a portable computing device to a relatively fixed object utilizing cable and lock mechanism, for example. However, such physical security measures may be easily compromised by surreptitiously obtaining a key, for example, by severing a cable, and/or compromised (e.g., stolen) by other means. In such instances, theft of portable computing devices may not only represent loss of physical assets, such as the portable computing device itself, but may also represent a loss of valuable trade secrets, such as proprietary software, proprietary configuration files, employee passwords, and so forth.

Accordingly, embodiments may provide a docking system that alleviates many of the drawbacks and vulnerabilities of conventional portable computer docking systems. In particular embodiments, a docking system for a portable computing device, such as a handheld tablet computing device, for example, may permit the portable computing device to be relatively easily unlocked and/or undocked.

FIG. 1 is a perspective view of an implementation of an example docking system and/or docking arrangement including a portable computing device within an enclosure, such as portable computing device 150 within an enclosure 120. In embodiments, such as embodiment 100, enclosure 120 may be secured to a case mount (not shown in FIG. 1) which, in turn, may be fixedly secured to base mount 450 according to an embodiment. Base mount 450 may cooperate with vertical arms 131 of stand 130 to provide a means of docking portable computing device 150, which may facilitate communications with a wired network, facilitate charging of an onboard battery, and so forth. Base mount 450 may be placed into physical contact with a case mount (not shown in FIG. 1), which may be attached to a case side of enclosure 120. In particular embodiments, by fixedly securing enclosure 120 to base mount 450, via a case mount, portable computing device 150, operating within enclosure 120, may be permitted to rotate and/or flip about axis 135 of stand 130. For example, in a possible embodiment, such as in a kiosk of retail establishment, portable computing device 150 may display an order listing, for example, showing items ordered by a customer. Store personnel may then turn and/or flip enclosure 120 about axis 135 in order to permit a customer to view and/or interact with a display of portable computing device 150. Such interaction may include reviewing a transaction, approving a transaction, electronically signing at an appropriate location on a display of portable computing device 150, and so forth.

It should be noted that enclosure 120 is merely an example enclosure, which may enclose a tablet computing device. In other embodiments, enclosure 120 may accommodate other electronic devices, for example, such as other types of displays and/or devices that provide user interfaces, for example, without necessarily providing "computing" capabilities per se.

Figure 2:
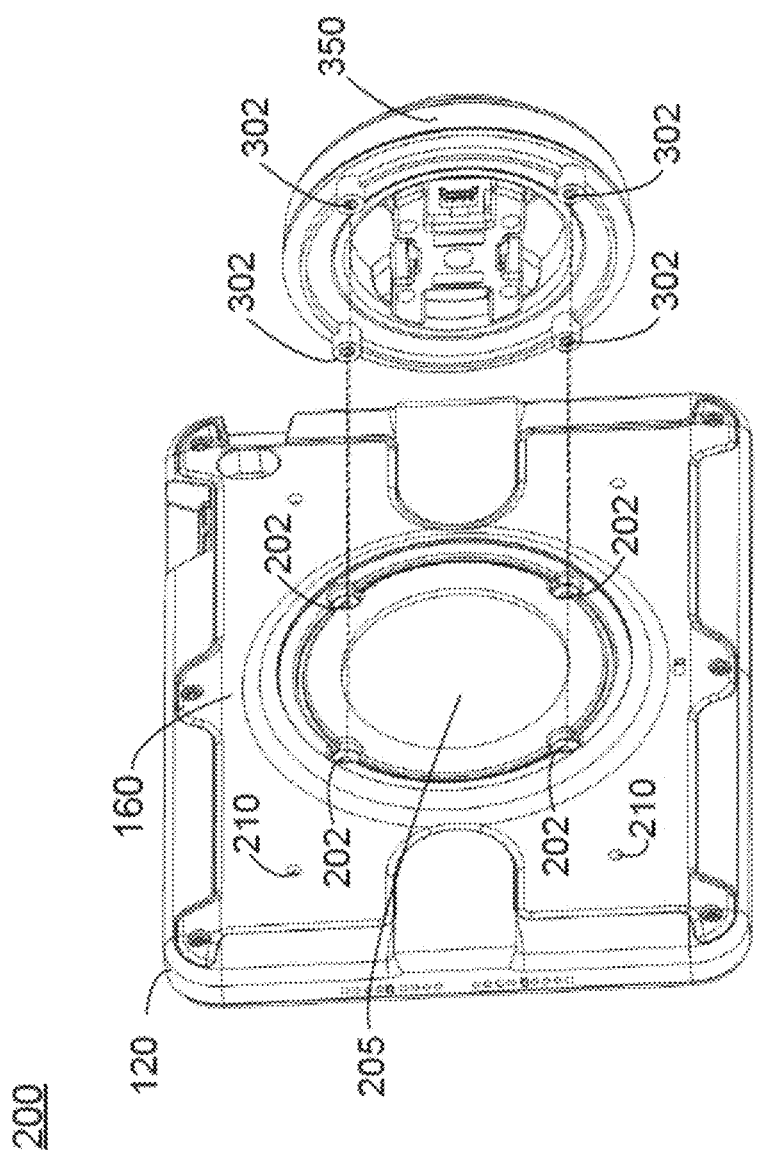
FIG. 2 is a perspective view of an implementation of an example portable computing device enclosure of FIG. 1 attaching to an enclosure side of the case mount.

FIG. 2 is a perspective view of an implementation of an example portable computing device enclosure of FIG. 1 attaching to an enclosure side of case mount 350 of a docking system, according to an embodiment 200. In embodiment 200, one or more screw holes, which may comprise four screw holes, referenced generally at 202, are shown as being capable of mating with corresponding screw bosses 302 of case mount 350. Although not explicitly indicated in FIG. 2, case mount 350 may comprise, for example, a port, a cable, and/or other type of wired connection, which may facilitate communication with a portable computing device, such as within portable computing device enclosure 120. Case side 160 of enclosure 120 may additionally include screw holes 210 which may, for example, accommodate attachment of a hand and/or shoulder strap, for example, D-ring fasteners, and so forth. In embodiments, use of a hand and/or shoulder strap may permit portable computer device 150, for example, to be securely carried from place to place.

In embodiments, case mount 350 may be capable of facilitating and/or supporting communications with a variety of portable computing devices, such as tablet computing devices, for example. Accordingly, case mount 350 may comprise signal conditioning and/or other electronics, which facilitate and/or support communication with, for example, tablet computing devices manufactured by the Samsung. Company of South Korea, tablet computing devices manufactured by Apple. Incorporated, of Cupertino Calif., and/or tablet computing devices manufactured by other entities. Accordingly, portable computing device 150 may comprise any display and/or computing device. In certain embodiments, case plate 205 of portable computing device enclosure 120 may comprise a common base plate capable of being interchanged with differently sized portable computing device enclosures. Thus, case mount 350 may comprise a capability to communicate with various portable computing devices, including tablet computing devices comprising various case sizes. By way of example, but not limitation, in some instances, case sizes of approximately 250.0 mm×180.0 mm (9.7 inch×6.9 inch), 230.0 mm×160.0 mm (9.0 inch×6.2 inch), and/or 200.0 mm×130.0 mm (7.7 inch× 5.2 inch), 200.0 mm×120.0 mm (7.7 inch×4.8 inch) may be used herein. It should also be noted that in particular embodiments, a portable computing device may not be disposed within an enclosure, such as enclosure 120, for example. In such instances, a case mount, such as case mount 350, may be secured to a removable panel of the portable computing device.

In particular embodiments, such securing of case side 160 of enclosure 120 to an enclosure side of case mount 350 may be facilitated by way of screws and/or other types of fasteners, which may provide compatibility with VESA (Video Electronics Standards Association) mounting brackets. Although four screw-type fasteners may be fitted and/or mated with screw bosses 302 of an enclosure side of case mount 350, other embodiments may utilize a different number of screw-type fasteners and/or screw bosses, and/or other types of fasteners, for example, to fixedly attach and/or secure an enclosure side of case mount 350 to, for example, case side 160 of enclosure 120. For example, an enclosure side of case mount 350 may be attached and/or secured to case side 160 of enclosure 120 utilizing three or fewer screw holes, and/or may utilize a greater number of screw-type fasteners, such as five or greater screw-type fasteners, for example.

As described in detail herein, case mount 350 may be removably secured to base mount 450 by way of one or more notches which may operate to physically connect with latches of base mount 450. Base mount 450 may attach and/or couple to a relatively fixed and/or stable surface, such as a wall and/or a desk, and/or may be attached to a base and/or stand, just to illustrate possible examples.

Figure 3:
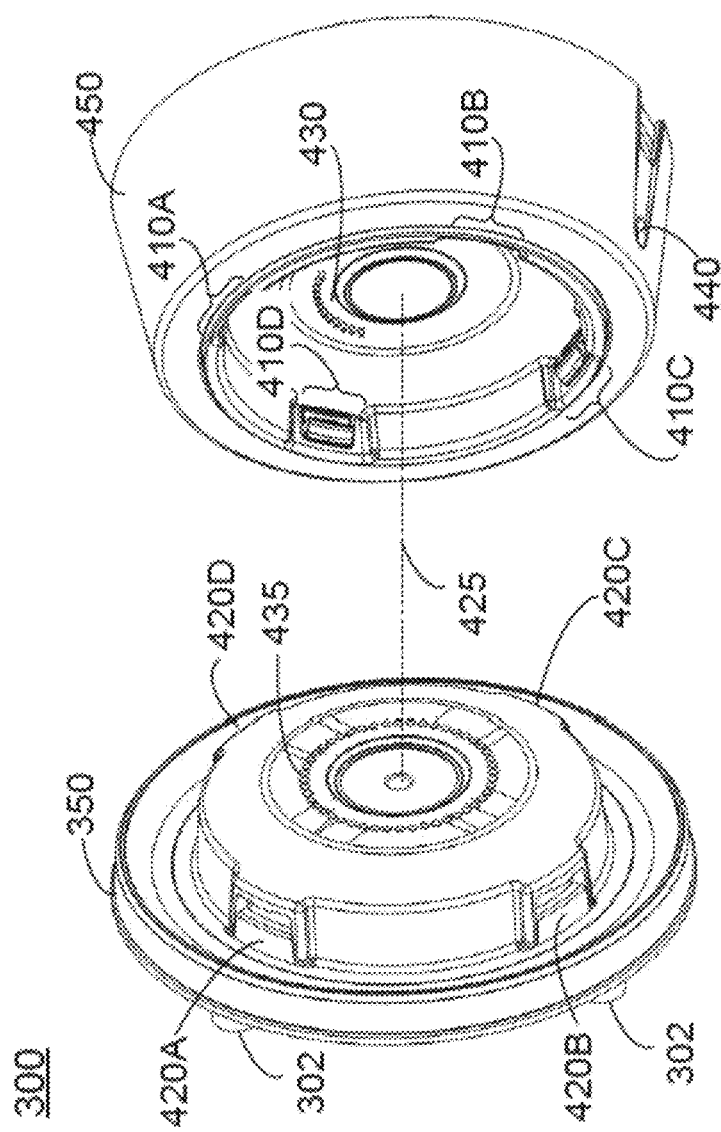
FIG. 3 is a perspective view showing an example implementation of an example base side of a case mount attaching to a case side of base mount of a docking system.

FIG. 3 is a perspective view showing an implementation of an example base side of a case mount, such as case mount 350 of FIG. 2, for example, attaching to a case side of base mount of a docking system, such as base mount 450 of FIG. 2, according to an embodiment 300. As shown in FIG. 3, screw bosses 302 are present at an enclosure side of case mount 350 of FIG. 3. In embodiments, case mount 350 may be referred to as a "male" mount, and base mount 450 may be referred to as a "female" mount. As shown in FIG. 3, case mount 350 may comprise, for example, one or more attachment means, such as latches 410A-410D capable of fixedly securing case mount 350 to base mount 450, such as via one or more corresponding notches 420A-420D, for example. In embodiments, as the base side of case mount 350 is brought toward the case side of base mount 450, such as along dotted line 425, four of latches 410A-410D may couple to four (corresponding) notches 420A-420D, wherein latches and notches are disposed in one of four quadrants each disposed at approximately 90.0° increments. However, other example embodiments may use of any number of latches, and corresponding notches, such as three or fewer latches and corresponding notches, as well as five or more latches and corresponding notches, for example. In one particular embodiment, three latches and three corresponding notches may be utilized wherein latches and notches are each disposed at approximately 120.0° increments.

In particular embodiments, case mount 350 may comprise, for example, a circular and/or round-shaped body having a plurality of contacts 435, and one or more notches 420A-420D. Also in particular embodiments, base mount 450 may comprise a plurality contact pins such as "pogo" pins 430 (further described with reference to FIG. 4) embedded therein and one or more latches 410A-410D. Case mount 350 may be matingly received by base mount 450 in a manner that engages latches 410A-410D with corresponding notches 420A-420D. In embodiments, if latches 410A-410D are engaged with corresponding notches 420A-420D, a plurality of contacts 435 may be brought into physical contact with base mount contacts 430. Additionally, although latches 410A-410D and notches 420A-420D are shown in FIG. 3 as being spaced apart from one another by approximately 90.0° on an approximately circular surface of case mount 350, other example embodiments may embrace any spacing of latches and corresponding notches. In embodiments 300 and 400, latch 410A may physically connect with and/or attach to notch 420A, latch 410B may physically connect with and/or attach to notch 420B, latch 410C may physically connect with and/or attach to notch 420C, and latch 410D may physically connect with and/or attach to notch 420D, for example. In particular embodiments, utilizing three or four, for example, latches and notches disposed around base mount 450 and case mount

350 may operate to facilitate uniform clamping pressure to secure base mount 450 to case mount 350.

As shown in FIG. 3, if case mount 350 and base mount 450 are connected to one another, such as by securing latches 410A-410D with corresponding ones of notches 420A-420D, base mount contacts 430 may connect with contacts 435, for example, of a contact group of case mount 350. In particular embodiments, as described in reference to FIG. 3 and others herein, base mount contacts 430 may be capable of physically connecting to one of four contact groups divided into four electrically independent quadrants of case mount 350. For example, in certain embodiments, a single set of contacts of base mount 450 may connect with contacts of a contact group of case mount 350 while case mount 350 is oriented at one of four electrically divided quadrants, oriented at, for example, at approximately 0.0°, 90.0°, 180.0°, and 270.0°, for example. Accordingly, if a case mount is mounted, for example, to a portable computing device enclosure, such as portable computing device enclosure 120 as shown in FIG. 1, the portable computing device enclosure may be rotated in a plane so as to be oriented, for example, at 0.0°, 90.0°, 180.0°, or 270.0°, thus corresponding to use of a portable computing device in one of four orientations, which may include a portrait mode, a landscape mode, an inverted mode (e.g., upside down), and so forth.

In embodiments, base mount 450 may comprise a manual lock/unlock feature 440. Accordingly, responsive to insertion of, for example, a rod and/or cylinder-shaped tool, perhaps accompanied by applying clockwise or counterclockwise rotation, for example, latches 410A-410D may be manually disengaged from corresponding notches 420A-420D, for example. In particular embodiments, base mount 450 may be unlatched and/or disengaged from case mount 350 via a computer-implemented method and/or application that runs on portable computing device 150, for example. See examples of such techniques described herein. It should be noted that example embodiments may embrace a variety of approaches which may bring about the engagement and disengagement of case mount 350 from base mount 450.

Base mount 450 may comprise a network interface which may include any type of network and/or subnetwork which may communicate, for example, via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

In an embodiment, base mount 450 may receive electrical power, such as in the form an approximately 24-volt signal utilizing one or more conductors. In a particular embodiment, wherein a network interface comprises an Ethernet interface, base mount 450 may receive an approximately 24.0 V signal utilizing Power over Ethernet, in accordance with one or more revisions of IEEE 802.3af-2003, IEEE 802.3at-2009, or the like, available from the IEEE standards group. In a network interface may utilize a single conductor and ground pair, and/or may utilize a number of conductors in accordance with voltage and current requirements of base mount 450, case mount 350, and/or portable computing device 150, for example. In other embodiments, base mount 450 may receive alternating current and/or direct current utilizing other types of power sourcing equipment. A network interface may direct received alternating and/or direct current electrical power in the direction of a DC-DC converter/regulator. In embodiments, a DC-DC converter/regulator may comprise circuitry to convert and/or to regulate received electrical power to comprise voltage and/or current parameters suitable for use by, for example, a network protocol converter, a microcontroller, a lock controller, an auxiliary Universal Serial Bus (USB), as well as voltage and/or current parameters suitable for use by components of the case mount 350 and portable computing device 150, for example.

In particular embodiments, a DC-DC converter/regulator may provide output signals comprising voltages of 5.0 VDC, 12.0 VDC. Other example embodiments may embrace voltage and/or current conversion/regulation so as to provide any number of DC and/or AC voltages, such as voltage signals of less than 5.0 volts, voltage signals greater than 12.0 volts. In embodiments, a DC-DC converter/regulator may perform voltage up-conversion to provide voltage signals greater than 24.0 VDC, such as 28.0 VDC, 36.0 VDC, 48.0 VDC, and so forth, virtually without limitation.

A network protocol converter may operate to facilitate protocol conversion between Ethernet and USB, although other example embodiments may embrace protocol conversion between any number of serial and/or parallel data stream conversions. A network protocol converter may execute conversion of binary digital signals between an auxiliary USB driver and a network interface.

In embodiments, activation/deactivation of a lock controller may be signaled via user input, such as by way of a portable computing device docked on a base. See examples described herein. A lock controller may be capable of actuating latch actuator, for example, to permit latches 410A-410D to disengage from corresponding notches of a case mount, for example. Latches 410A-410D may also be disengaged and and/or engaged from corresponding notches of a case mount, for example, responsive to receipt of an instruction generated by a computer program operating, for example, on portable computing device 150.

A microcontroller, in an embodiment, may direct operations of base mount 450. In embodiments, microcontroller 490 may comprise one or more computer processors coupled to one or more memory devices, which may provide one or more sources of executable computer instructions from a non-transitory computer-readable storage medium in the form physical states and/or signals (e.g., stored in memory states), for example. A microcontroller may communicate with portable computing device 150 by way of base mount contacts, for example. Accordingly, a microcontroller may communicate with case mount 350, which may be physically coupled and/or directly attached to portable computing device 150. In embodiments, a network protocol converter of base mount 450 may communicate with case mount 350 utilizing, for example, a USB interface.

Case mount 350 may additionally comprise device-specific signal conditioning, which may adapt one or more discrete signals from base mount 450 to signals capable of being interpreted by portable computing device 150. For example, device-specific signal conditioning 392 may provide appropriate signal levels at, for example, appropriate timing intervals specific to portable computing device 150. Device-specific signal conditioning may provide overvoltage protection to portable computing device 150 such as, for example, by terminating a voltage signal to portable computing device 150 that may bring about damage to the portable computing device, for example. In another embodiment, device-specific signal conditioning may provide a signal to portable computing device 150 to indicate that an external USB port, for example, is to be powered by base mount 450 rather than portable computing device 150, just as an example.

Case mount 350 may further comprise a device charge monitor, which may, for example, monitor a rate of charging of portable computing device 150, which may ensure that portable computing device 150 does not consume electrical current at a rate beyond one or more specified limits. In addition, case mount 350 may comprise a device-specific wiring interface, in which conductors are arranged and/or organized into a cable suitable for use with portable computing device 150. In one example, device-specific wiring interface 394 provide communication with an Apple iPad, utilizing, for example, a "lightning" connector. As also discussed herein, communication via headphone port and/or microphone port may also be implemented, in embodiments.

Figure 4:
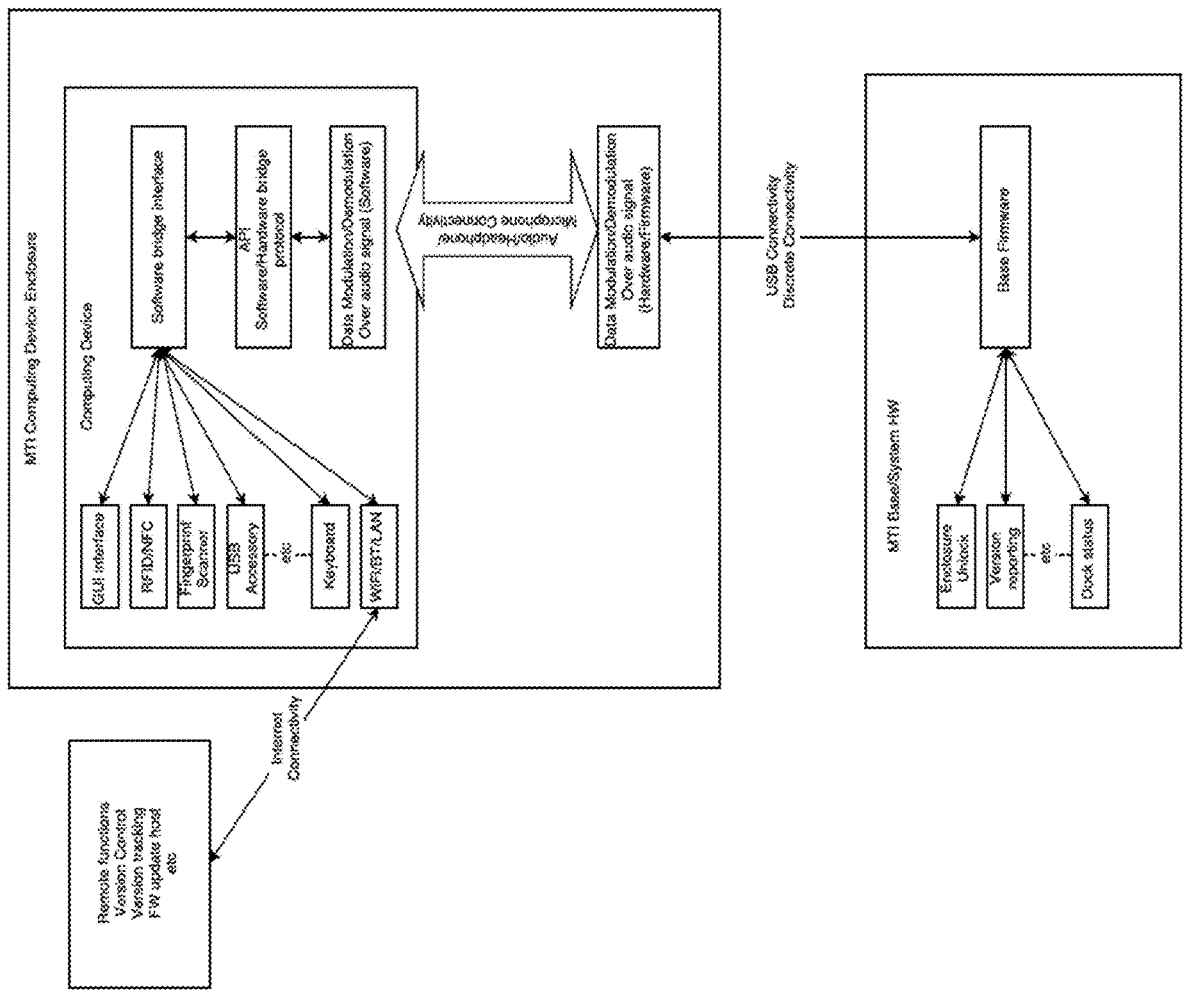
FIG. 4 depicts an example schematic block diagram including an implementation of an example base/system hardware, example computing device enclosure, and example computing device.
Figure 5:
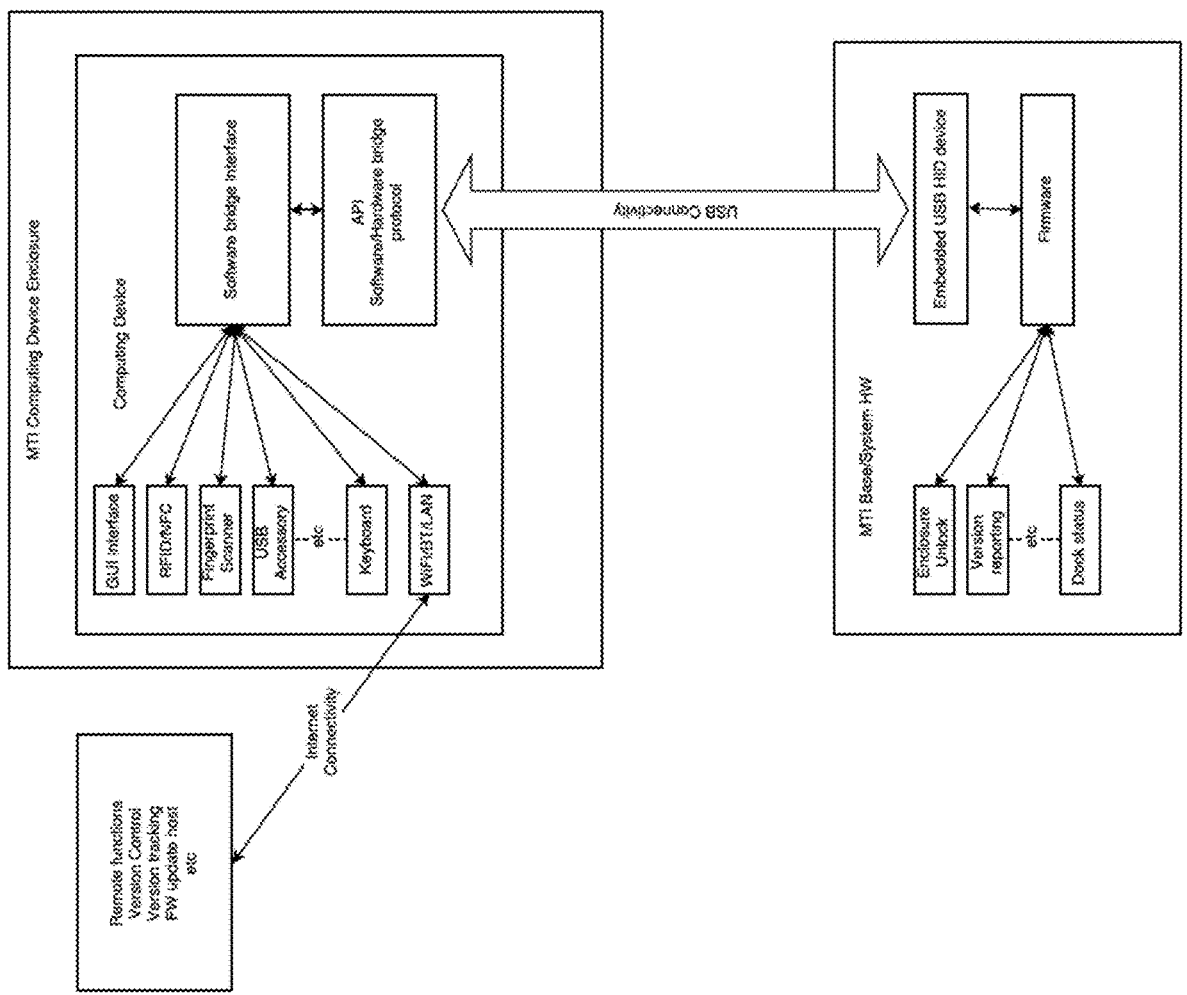
FIG. 5 depicts another example schematic block diagram including an implementation of an example base/system hardware, example computing device enclosure, and example computing device.

For the discussion herein, reference may be made to FIG. 4 and/or FIG. 5, depicting example schematic block diagrams including implementations of example base/system hardware, example computing device enclosure, and example computing device.

Figure 6:
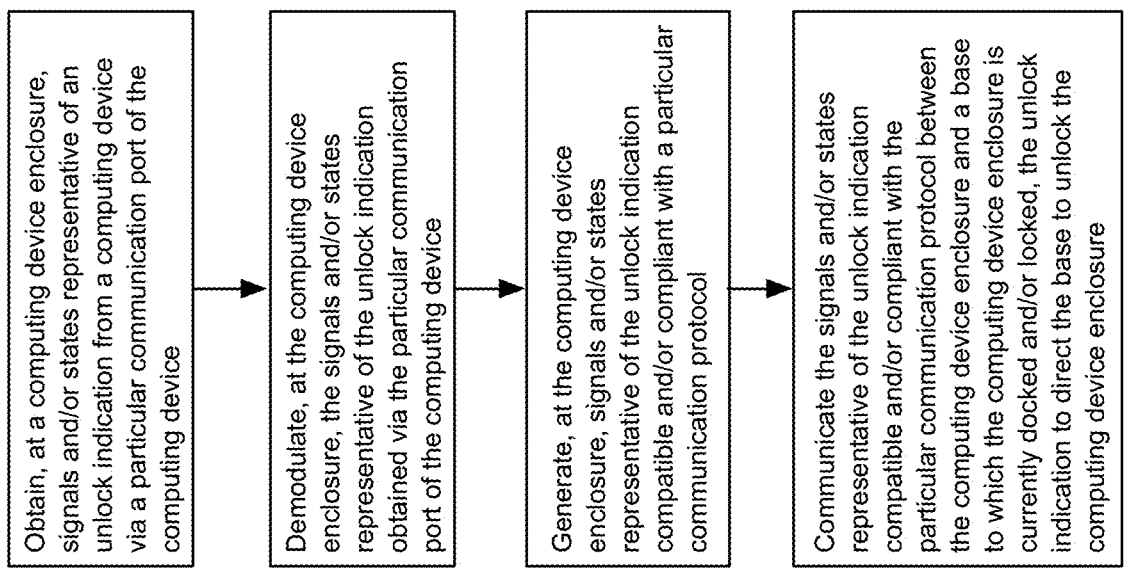
FIG. 6 depicts an example embodiment of a process for unlocking a computing device enclosure from a base.

FIG. 6 depicts an example embodiment of a process for unlocking a computing device enclosure from a base. In an embodiment, an example process may include obtaining, at a computing device enclosure, signals and/or states representative of an unlock indication from a computing device via a particular communication channel and/or port, such as a headphone, microphone, etc. port of the computing device, such as depicted in FIG. 4. In an embodiment, the signals and/or states representative of the unlock indication obtained via a particular port may be demodulated in some manner, such as at the computing device enclosure, as one possible example, such as depicted, for example, in FIG. 4. Further, in an embodiment, signals and/or states representative of the unlock indication compatible and/or compliant with a particular communication protocol, such as a Universal Serial Bus (USB) protocol, as one possible example, may be generated at the computing device enclosure, such as depicted in FIG. 4, for example.

Also, in an embodiment, the signals and/or states representative of the unlock indication compatible and/or compliant with the particular communication protocol may be communicated between the computing device enclosure and a base to which the computing device enclosure may be currently docked and/or locked, as depicted in FIG. 4, for example. In an embodiment, the unlock indication may direct the base to unlock the computing device enclosure, such as via an appropriate locking and/or unlocking mechanism and/or feature, thereby facilitating "unlocking" and/or removal of the computing device enclosure from the base. In this manner, in accordance with an example embodiment, a computing device, such as a tablet, as one possible example, may communicate via a computing device enclosure an indication to the base that the enclosure is to be unlocked from the base. In an embodiment, a user may indicate via some sort of input to the computing device a desire to unlock the enclosure from the base, such as via a particular command, user input, etc. The example process described above may be employed, in an embodiment, to communicate the user's desire to the base.

Figure 7:
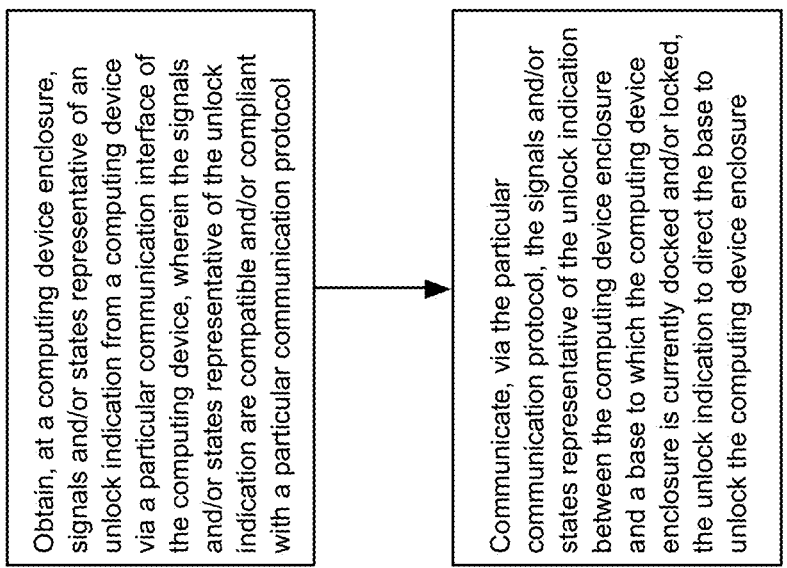
FIG. 7 depicts another example embodiment of a process for unlocking a computing device enclosure from a base.

FIG. 7 depicts another example embodiment of a process for unlocking a computing device enclosure from a base. In another embodiment, a computing device may communicate via a particular communication interface, such as USB, as one possible example, with a base, such as to indicate an unlock. See, for example, FIG. 5. In an embodiment, an example process may include obtaining, at a computing device enclosure, signals and/or states representative of an unlock indication from a computing device via a particular communication interface, such as USB, of the computing device, wherein the signals and/or states representative of the unlock indication are compatible and/or compliant with a particular communication protocol, such as USB, for example. In an embodiment, the signals and/or states representative of the unlock indication may be communicated, via the particular communication protocol, between the computing device enclosure and a base to which the computing device enclosure is currently docked and/or locked, wherein the unlock indication directs the base to unlock the computing device enclosure. Although USB is mentioned as a particular communication interface and/or protocol, other example embodiments are not limited in scope in this respect. Other embodiments may be implemented utilizing other communications interfaces and/or protocols, either currently existing and/or to be developed in the future.

As enclosure ecosystems expand and/or increase in complexity and/or feature set, it may be beneficial to add communications between computing devices, such as tablet computing devices, for example, and enclosure platform hardware. Such communications may open up a relatively large potential in features while maintaining costs in a competitive market. For portable computing devices compatible and/or compliant with Apple Computer, Inc.'s (Apple) iOS operating systems, a relatively few techniques for communication with a computing device may currently exist: wireless and/or wired. Of course, examples discussed herein are not limited to current and/or past techniques, technologies, etc., but may also be employed in connection with future communication techniques, technologies, etc.

In some circumstances, wired communication may be utilized due to reliability and/or environmental variables. There may also exist additional advantages for wired communication such as, for example, providing a relatively exact location trigger whereas wireless may provide less accurate location determination. For example, wireless communication may provide location proximity, rather than a more precise location. For example, for a circumstance wherein a computing device and enclosure are docked on a base, a wired solution may provide relatively enhanced visibility into which exact base it was docked on (if there are multiple bases in the same vicinity, for example). A wireless solution may not allow for that sort of hardware matching fidelity. Having this type of relatively exact pairing may be beneficial for enterprise customers and/or asset tracking/location services, for example. In some circumstances, for iOS based devices, there may be a relatively limited number of avenues to utilize a wired connection. For example, a Lightning (Apple) connector may be utilized, and/or an audio jack may be utilized. Using a Lightning connection may involve Apple's "made for iOS device" (MFI) certification process. Getting hardware certified for a particular ecosystem, such as including portable devices and docking stations, for example, may add potential complexity because of the different mix and match pieces (e.g., multiple enclosures that mount to multiple different bases, etc.). In an embodiment, a communication solution that doesn't involve MFI certification may be advantageous. In an embodiment, a headphone output and/or input (e.g., microphone, etc.) may be utilized, in whole or in part, in a process to communicate digital content. For example, rather than communicating recognizable audio content, a wired connection may be utilized and audio signals may be modulated to communicate digital content. There may be a number of difference approaches to modulating the audio signal. One such technique may include utilization of Frequency Shift Keying (FSK). An example of this technique may include generation of output signals at selected frequencies. Depending on a pattern of frequency output, digital bits may be constructed representative of desired content. Such a process may work relatively well due at least in part to being readily supported by conventional microprocessors that may be employed in a number of hardware designs. Further, use of an audio connection may not involve MFI and/or MFI-type certification, which may allow for flexibility of a docking system platform. With such wired digital content channel available, a hardware/product platform may take advantage of many features of a computing device to enable functions that may otherwise be cost prohibitive.

With such a wired digital content communication channel in place, base hardware may become somewhat interactive with any suitable software running on the computing device. Such a digital content channel may be used, at least in part, for quite a few purposes, such as local command/status messages between the base hardware and/or software running on the computing device, for example, among others. Such a communication channel may also expand hardware capabilities of a base unit to include capabilities of a computing device. For example, a base unit may leverage one or more connectivity capabilities of computing device to provide similar and/or like connectivity options to the base unit through software running on the computing device which manages one or more applicable interfaces. This could be used for such tasks as base unit firmware updates that may be pushed over and/or pulled from a network (e.g., the internet, etc.) through the computing device, through the established digital content communication channel and/or flashed on the base unit central processing unit, as a few possible examples.

In addition to firmware updates, this remote connectivity may also allow many other features, such as, for example, hardware and/or firmware version tracking for units in the field. In a same and/or similar manner, such capability may, for example, allow settings, commands and/or status of the base unit to be available to remote entities. Sensors available on a computing device may also become available to the base unit hardware by extension. An example may include temperature sensor and/or associated readings located in the computing device which may be made available to the base unit hardware.

Another example may include leveraging computing devices' available input devices (touch screen, keyboard, fingerprint scanner, retina scanner, NFC, WiFi, USB, etc) to provide credential and/or other suitable information that may be used, at least in part, for access control to the computing device. Utilizing the computing device's various input options by extension, the base unit and/or computing device may leverage the digital content communication channel, such as, for example, via a headphone/microphone jack, to communicate authentication status, and the base unit can use this information to unlock the enclosure allowing the computing unit in the enclosure to be undocked. In some instances, such integrated technology may make it possible for features, such as, for example, PIN code unlock, fingerprint scanner unlock, NFC badge unlock, password unlock, etc.

By nature of the computing device enclosure business segment, there may exist a priority to keep solution costs down by leveraging mass produced and/or highly capable computing devices available to the general consumer. Utilizing example technology disclosed herein may allow business entities to keep costs relatively down and/or maintain the general appeal of the enclosure business/market segment and also leverage and/or tap into the normally unavailable and highly rich connectivity/feature laden computing devices that enclosure products may pair with in order to provide overall features and/or solutions that may typically involve relatively significantly increased costs. With the fast pace of development with the enclosure ecosystem (e.g., supporting new tablets and/or computing devices as they are released, oftentimes without complete knowledge of these devices until the day of release, etc.) there may exist a relatively large road block to go through MFI certification for iterations of an enclosure platform. While it might be beneficial in some cases to go through MFI certifications, there are other situations where having an option that doesn't require certifications may be relatively very helpful to release products as quickly as possible. Timing of products in the market space of enclosure products may be relatively very important and/or products released on time may add a relatively huge competitive advantage. Example technology disclosed herein may help facilitate speed to market for many scenarios.

There are a number computing device enclosure solutions on the market today, but such conventional computing device enclosure solutions do not allow for tapping into the hardware, software and/or connectivity options of the computing device to extend/expand functionality of the enclosure hardware. As mentioned above, there may be a relatively large number of advantages enabled by utilizing the connectivity/features of the computing devices that would otherwise be cost prohibitive to implement (e.g., remote connectivity, version tracking, unit deployment information, FVV updates, user access input methods for actuating behaviors on our HVV, etc.) without implementing one or more aspects of technology, such as disclosed herein, for example.

In one or more example embodiments, a content communication channel may be established between, for example, a portable computing device and an enclosure/system. Depending on an implementation, such a communication channel may be formed using wired connectivity, such as via USB, serial, audio, microphone, and/or Ethernet, for example. Such a content communication channel may also comprise a wireless implementation such as via Bluetooth, WiFi, NFC, RFID, and/or InfraRed, for example.

In an embodiment, an enclosure, such as a portable computing device enclosure, may include a housing that may effectively surround a portable computing device, such as a tablet. An enclosure may protect the computing device and may further house additional electronics that may perform one or more dedicated functions. Some of these functions may include providing charging signatures to a base/system hardware to instruct the base what voltage is required to charge the computing device, for example. In this example, a computing device enclosure may also house electronics that may enable an audio/headphone/microphone and/or other communication signal between a portable computing device and the enclosure.

Figure 8:
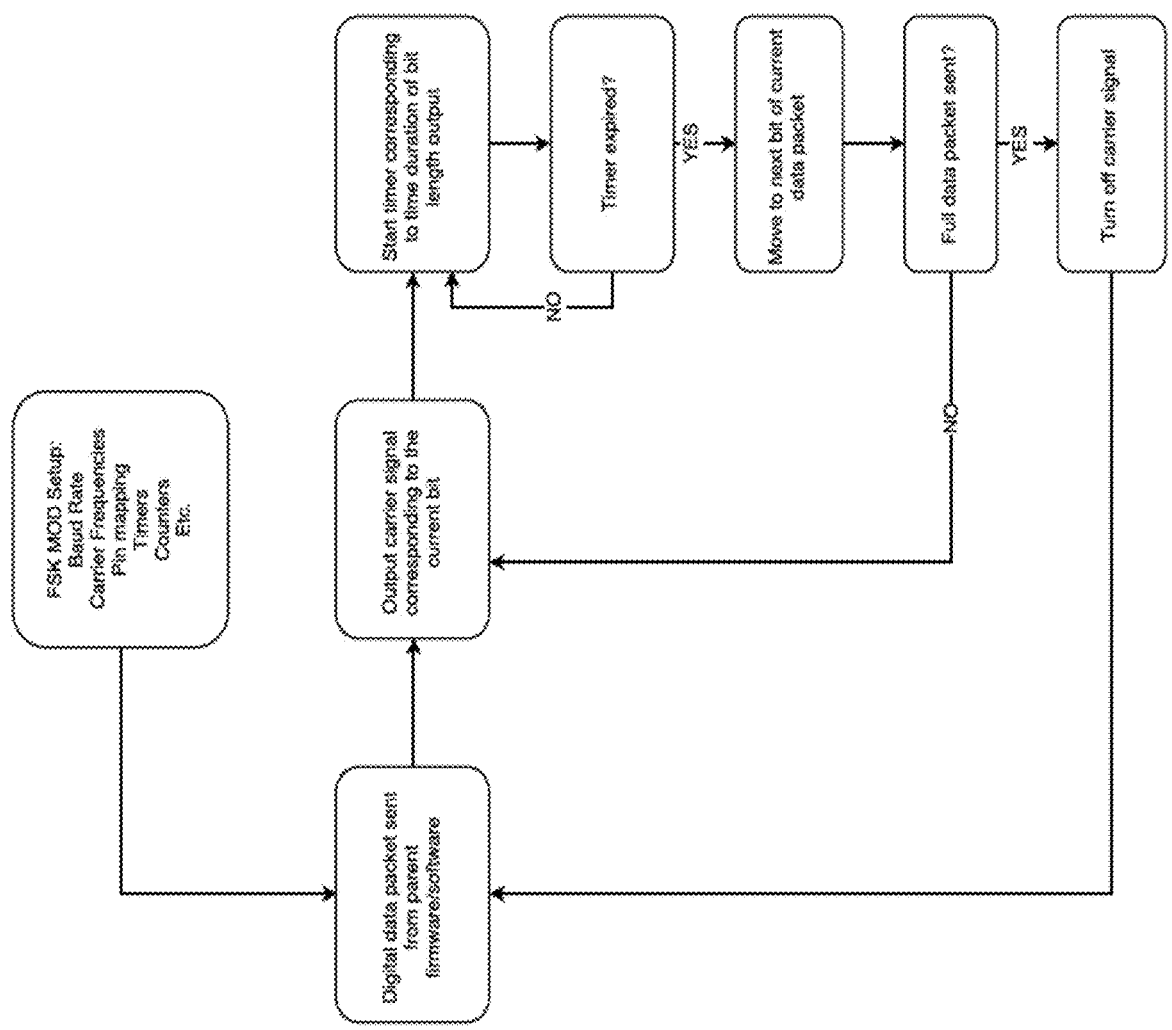
FIG. 8 depicts an example embodiment of a process for content modulation.
Figure 9:
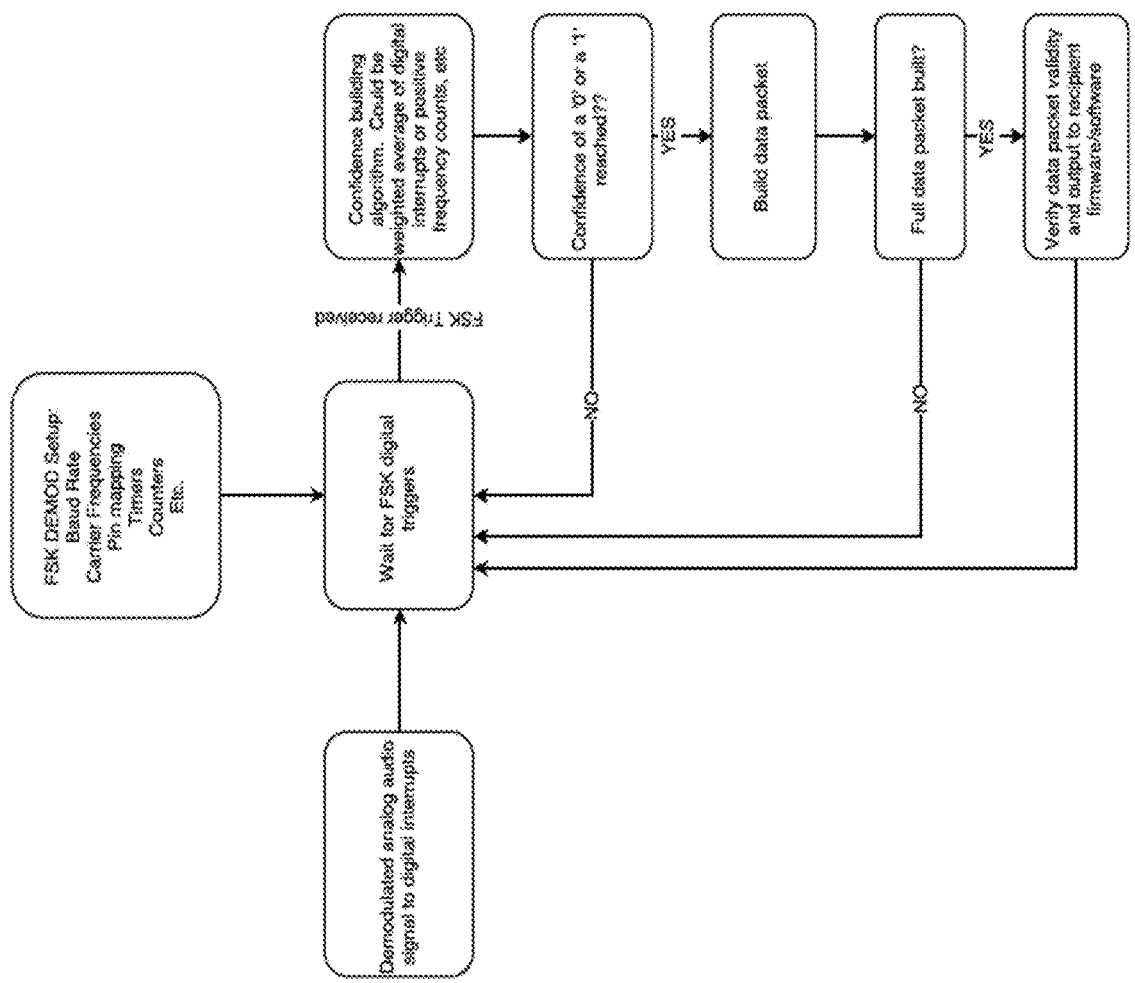
FIG. 9 depicts an example embodiment of a process for demodulation.

In an embodiment, content modulation/demodulation over audio signal may be implemented via electronics and/or firmware to interface with and/or communicate with a computing device, such as a portable computing device, over a headphone/microphone interface, for example. An implementation of an example process for content modulation is depicted in FIG. 8, and an implementation of an example process for content demodulation is depicted in FIG. 9. Of course, embodiments are not limited to the specific examples depicted and/or described.

As mentioned, FIG. 8 depicts an example embodiment of a process for content modulation. As indicated, a Frequency Shift Key technique may be employed, for example. In an embodiment, baud rate, carrier frequencies, pin mapping, etc., may be specified. Such a technique may also employ timers, counters, etc. In an embodiment, content, such as a packet of content, may be obtained from parent software and/or firmware executed on a processor. An output carrier signal representative of a current bit may be generated, for example. In an embodiment, a timer may be started. For example, a timer interval may correspond to a time duration of a bit length output. In an embodiment, a determination may be made as to whether the timer has expired. Such a determination may be repeatedly made, in some circumstances, until it may be determined that the timer has expired. In an embodiment, expiration of the timer may indicate to generate a next bit of content. Further, in an embodiment, at least in part in response to a determination that a full packet of content has not been communicated, additional bits of content may be processed in a manner similar to that outlined above. Also, in an embodiment, at least in part in response to a determination that the full packet of content has been communicated, a carrier signal may be turned off, as indicated, for example, in FIG. 8.

FIG. 9 depicts an example embodiment of a process for demodulation. As indicated, a Frequency Shift Key technique may be employed, for example. Also, as mentioned above, baud rate, carrier frequencies, pin mapping, etc., may be specified, for example, and timers, counters, etc. may be employed, in an embodiment. As depicted in FIG. 9, an analog audio signal, such as may be previously modulated and as may be obtained via a microphone/audio input port, for example, may be demodulated and/or utilized as indications of digital interrupts. In an embodiment, an audio signal may exit the computing device in the form of a sine wave at one of two frequencies, for example. The sine wave may be of varying amplitude and/or may be centered on 0V (e.g., both positive and negative amplitudes), for example. Hardware demodulation circuit may, in an embodiment, amplify the analog sine wave signal and/or may compare it to a reference voltage that may have a magnitude of just barely above 0V, for example. In an embodiment, if the analog sine wave travels some distance above 0V, the signal may be pulled to logically high voltage level. If the amplitude of the analog signal travels below 0V, the output signal may be pulled to a logically low signal level. In this manner, for example, regardless of amplitude, the analog sinusoidal signal may be converted into a square wave. In an embodiment, the square wave may be communicated to a microprocessor via an interrupt enabled digital input pin. In an embodiment, if the digital signal goes high or low, the microprocessor may be informed via an interrupt and appropriate action, such as, for example, timing measurements, etc., may take place to, in whole or in part, calculate an input frequency of the digital signal. In an embodiment, at least in part in response to an indication and/or determination of one or more FSK triggers, such as may be indicated by a demodulated audio signal, for example, a confidence building algorithm and/or process may be performed. In an embodiment, a confidence building algorithm may include weighted averages of digital interrupts and/or positive frequency counts, for example.

In an embodiment, at least in part in response to a confidence that a "1" bit or a "0" bit has been detected, a packet of content may be built, as depicted, for example, in FIG. 9. Bits of content may be added to a packet until the packet is complete, or full, as also depicted in FIG. 9, for example. In an embodiment, a packet of content may be verified and/or validated, and the content passed on to recipient firmware/software. For example, verified and/or validated content may be stored in a memory and/or made available to one or more other processes.

For example demodulation hardware, an audio cable may bring left/right audio output signals from a computing device, such as a portable computing device, to electronics situated within an example enclosure. Such electronics may, for example, convert the analog audio signal into a digital input signal. A first implementation of an example circuit for demodulation is depicted in FIG. 10.

Figure 10:
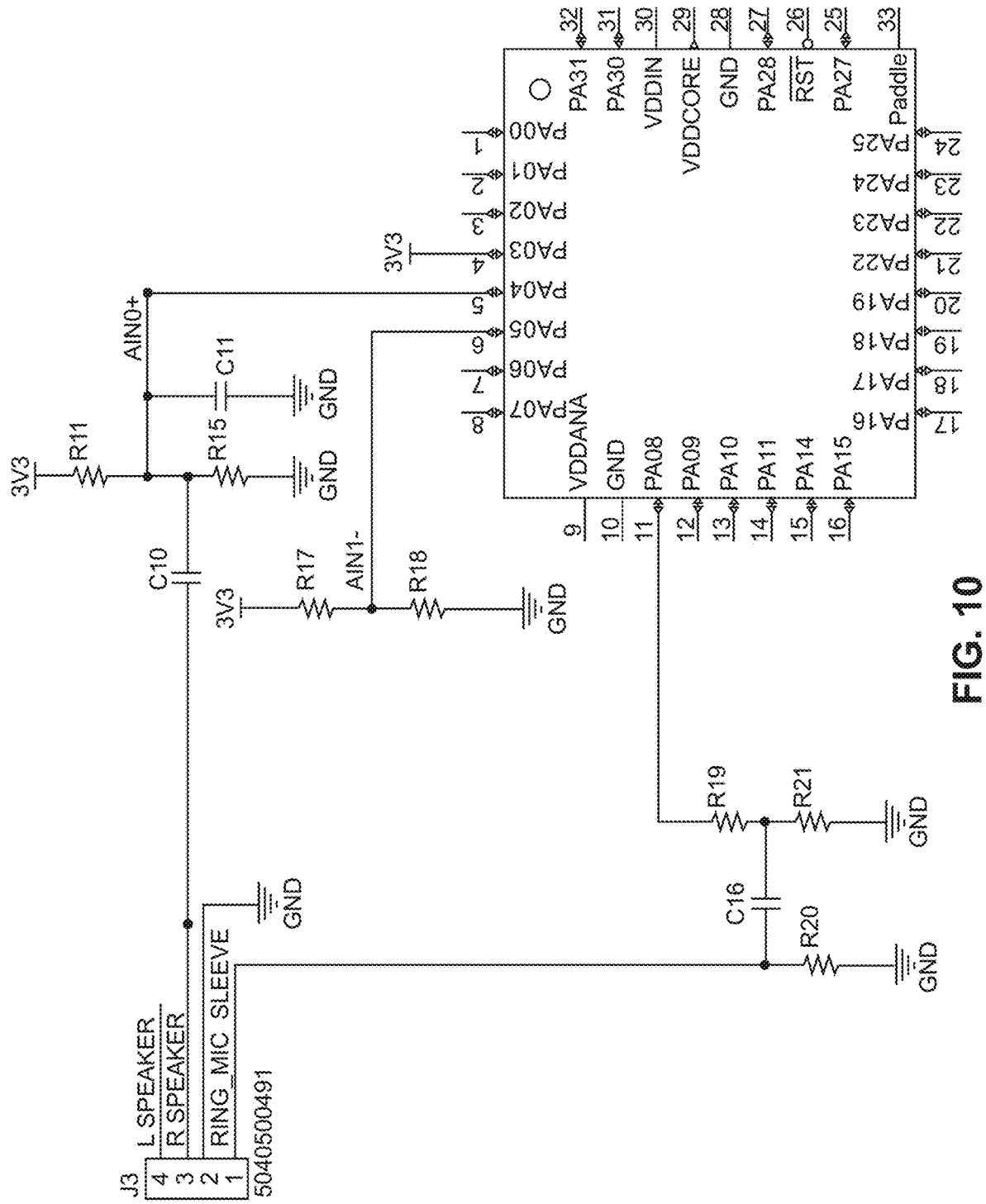
FIG. 10 depicts an implementation of an example circuit for demodulation.

The example circuit of FIG. 10 functions but may operate more reliably, for example, with a volume control of the computing device turned up to a relatively significant level. A particular volume level may be relative to a particular computing device, but may be anywhere from ⅓ to ⅔ of full volume in an example embodiment. For the particular example of FIG. 6, circuitry may take one of two audio output signals (e.g., left and right signals) from the computing device and may AC couple the signal to an onboard comparator that may be located in a microprocessor. The analog signal may be compared to a reference voltage formed by R17 and R18, thereby transforming the analog signal into a digital signal with matching frequency, for example.

Figure 11:
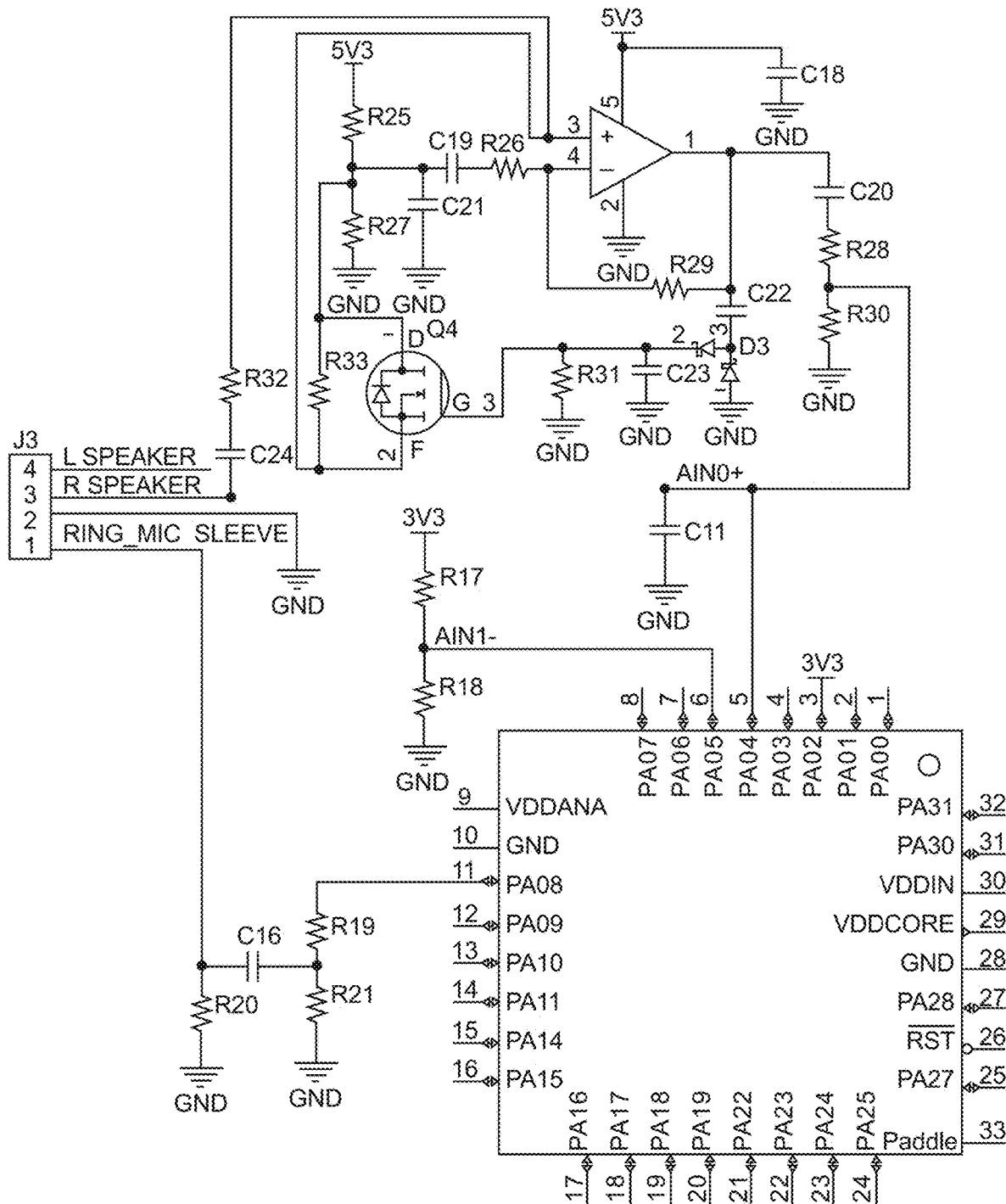
FIG. 11 depicts an implementation of an example demodulation circuit that includes automatic gain control and/or an improved pre-amplification stage.

FIG. 11 depicts an implementation of an example demodulation circuit that includes automatic gain control and/or an improved pre-amplification stage which may, for example, allow an audio signal to be processed at lower volume levels. The circuit of FIG. 11 may also AC couple the analog audio signal from the computing device but incorporates a gain stage to boost the signal level which makes the circuit relatively more effective at lower volume levels from the computing device. This circuit may also adjust gain levels depending at least in part on the level of audio output signal.

For example circuitry of FIG. 10 and/or FIG. 11, communication paths for content directed to the computing device (e.g., via a microphone port, etc.) may include a digital signal from a microprocessor that may be AC coupled to a microphone input, in an embodiment. A resistor, such as R20, may be within a particular range of resistance value in order for a particular computing device, such as an iOS computing device, for example, to recognize that a 'microphone' is connected.

Along with the above example hardware circuitry, software and/or firmware executable by a microprocessor, the modulation/demodulation may be performed. Various embodiments may implement any of a wide range of techniques, technologies, etc., currently existing and/or to be developed in the future, such as for modulation/demodulation. In an embodiment, a two frequency FSK scheme may, for example, be employed. In a particular embodiment, two frequencies, such as 4 khz and 8 khz, may be utilized, at least in part, and may alternate between those frequencies to represent ones and zeros. Of course, other frequencies may be utilized, in whole or in part. In an embodiment, frequencies utilized may be specified to be within an audio range of 20 hz to 20 khz, for example. At times, selection of frequencies too close to either boundary of a specified range may result in decreased performance, depending at least in part on computing device audio circuitry fidelity, for example. Further, in an embodiment, it may also be beneficial to keep the two frequencies somewhat separated, such as for easy detection between the two. Also, in at least one simulation and/or experiment, it has been observed that the lower the frequencies, the slower the overall content throughput and so higher frequencies may be considered to keep data rates up. FIGS. 8 and 9 may again be referred to for example one or more processes for modulation and/or demodulation, in accordance with one or more embodiments.

In an embodiment, circuitry for content modulation/demodulation, such as depicted in FIG. 10 and/or FIG. 11, and/or as also depicted in FIG. 4 and/or FIG. 5, for example, may also interface with hardware residing in a base/system. At times, such interfacing may be accomplished via discrete signals and/or via USB connectivity, for example, which may open up the features/functions of the base to have an interface with the computing device. For USB connectivity, for example, content modulation/demodulation circuitry may act as USB host and the circuitry in the base may include a USB device, in an embodiment. Such an example interface may utilize a human interface (HID) protocol with Speck and/or other encryption obfuscating content communicated and so forth.

In an embodiment, Audio/Headphone/Microphone Connectivity, such as depicted, for example, in FIG. 4, may be accomplished via a standard 3.5 mm audio cable that plugs into the computing device and also plugs into our circuit board that is housed in the enclosure, for example. Of course, any other suitable cabling may be utilized herein.

An example Content Modulation/Demodulation over audio signal block, (labeled data modulation/demodulation in FIG. 4 and/or FIG. 5, for example), may represent an example software library/framework that may be used, at least in part, in software residing on the computing device. Such an example library/framework may include a compliment function to firmware that may reside in an enclosure modulation/demodulation microprocessor. Relatively higher level content may be sent through this library/framework which may take the content and break it down into ones and zeros and then encode it to two frequency FSK audio signals, such as 4 kHz and/or 8 kHz, for example.

Referring again to FIGS. 4 and/or 5, an implementation of an example API Software/Hardware bridge protocol block may represent of a set of available features/functions that may be available in an example enclosure and/or base hardware implementation. The example API software/hardware bridge protocol may define relatively higher level content/command/status that may be successfully and/or otherwise suitably communicated between software running on the computing device and hardware/firmware located in the enclosure and/or base. Example API documentation may be found below, labeled "API Software-Hardware bridge protocol"

Again referring to FIGS. 4 and 5, an example Software bridge interface block may represent software executable by a computing device that interfaces with one or more of the many functions/features/peripherals of the computing device and the example API/Enclosure/Base hardware. As may be the case with software and one of the many potential advantages of this example type of architecture, the possibilities of what may be accomplished are plentiful. Examples that may be implemented include using a GUI interface of a computing device to allow for PIN codes and/or passwords to be used in order to unlock an enclosure from a base. So there would exist a GUI residing on the computing device screen which may prompt a user for a PIN code and/or password. At least in response to a user providing correct authentication content, executable software, if executed, may leverage the API and may send an unlock command to the enclosure which gets forwarded on to the base, resulting in the enclosure being unlocked from the base and allowing the user to undock the computing device/enclosure from the base. Another implementation may use access control, such as in a similar fashion, but instead of using a GUI based PIN code and/or password input approach, the software could utilize a fingerprint reader as the form of input, for example. At least in part to a fingerprint being authorized, the software, if executed, may send an unlock command downstream. In another embodiment, similar workflow may be accomplished using an RFID/NFC reader, for example.

In an embodiment, GUI Interface, RFID/NFC, etc. blocks, such depicted in FIGS. 4 and/or 5, may represent input/output functions that may be present on a computing device. Having access to these may enhance the function of what the hardware/firmware may be capable of doing. Some of these functions such as WiFi/Bluetooth/LAN/etc may provide potential access one or more communications networks, such as the internet and/or cloud, for example. This may enable a wide range of remote based functions/features to be possible such as Over The Air firmware updates to the firmware residing in an enclosure and/or base electronics, for example, just to name a few.

Figure 12A:
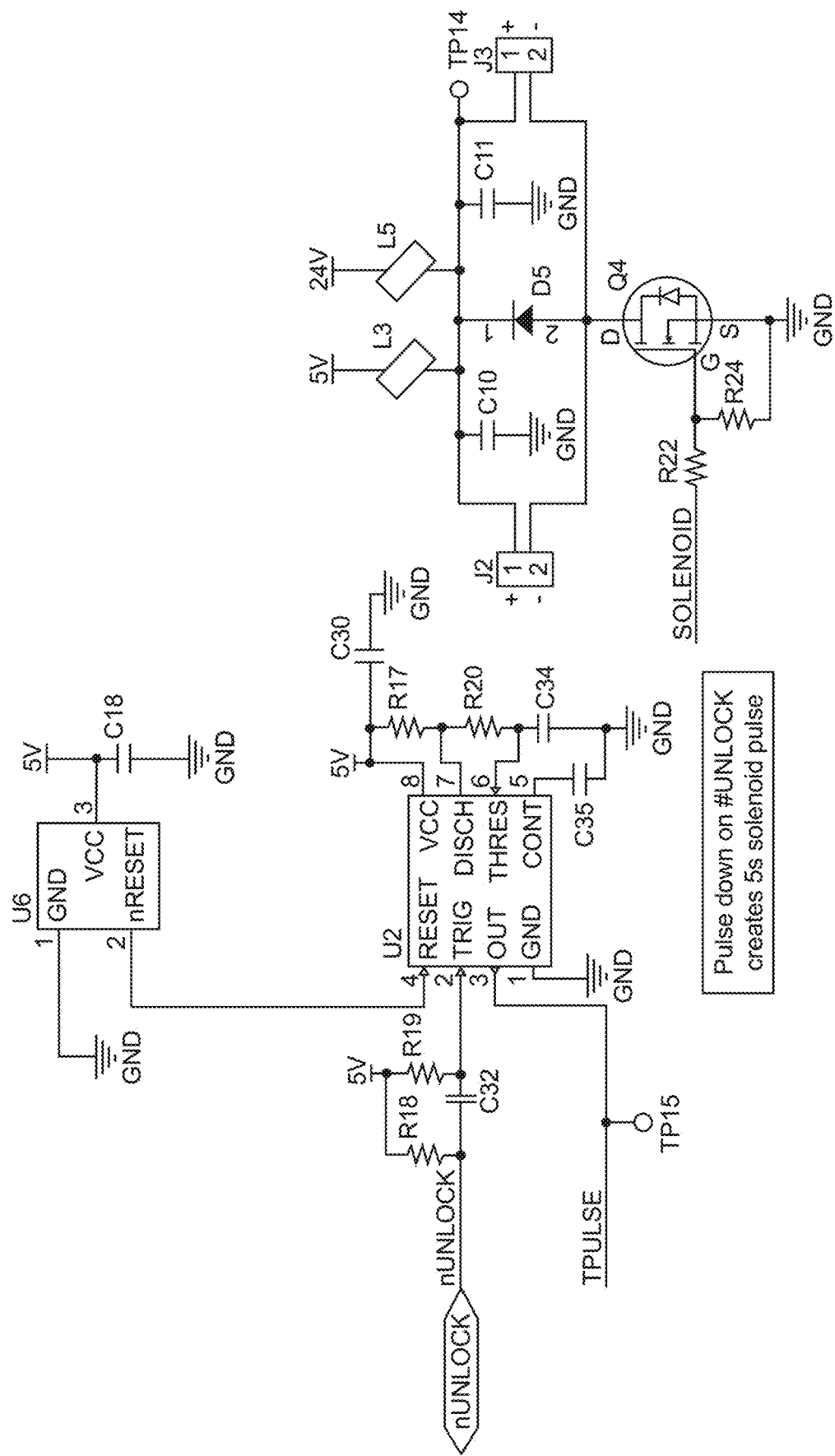
FIGS. 12A and 12B depict an example schematic with a USB interface and driving circuit for solenoids which unlock the enclosure of a docking system.
Figure 12B:
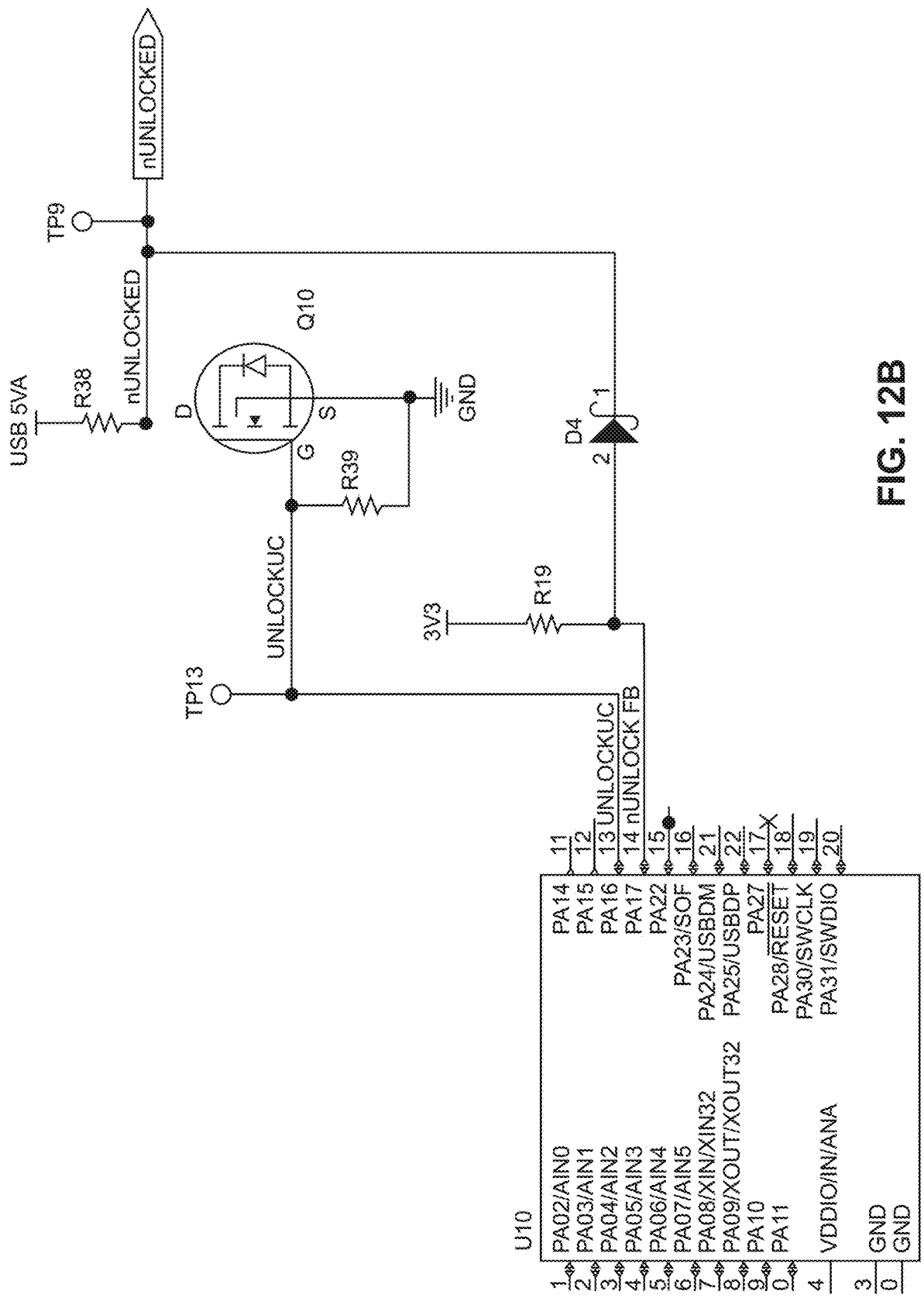

Further, in an embodiment, an example Base Firmware block may represent firmware residing on a microprocessor in a base. At times, such firmware may be on the receiving end of USB and/or discrete communications from enclosure hardware. Such firmware may control hardware in the base, for example. For the unlock example, at least in part in response to the enclosure obtaining an unlock command from the computing device, the command may be propagated to the base through the USB and/or discrete communication paths. The base firmware, upon being executed, may translate applicable communication and drive an unlock circuit in the base that may release the enclosure from the base. An example schematic depicted an example implementation is depicted in FIGS. 12A and 12B, with the USB interface and driving circuit for the solenoids which unlock the enclosure, in an embodiment.

Following illustrates non-limiting example aspects for an implementation of an example API Software-Hardware bridge protocol. For example, the following is an example API interface for a particular docking tablet application that may be implemented, in whole or in part, utilizing one or more techniques, technologies, etc., discussed herein. The example API may be implemented over a USB HID interface, and/or content may be encrypted using a Speck cipher, in an embodiment. The cipher may be implemented using 64-bit blocks of content and a 128-bit key, for example. The following general steps may be used, in whole or in part, to send a command:

The tablet application decides to send a command to the device.

The application creates a random public key and sends it to the device.

The device responds by sending its random private key that has been encrypted with the received public key back to the application.

The application then encrypts the command with the received private key and sends the command to the device.

The device responds with a status update (or the content requested) that is encrypted with the same private key used to send the command.

USB DEVICE IDENTIFICATION. While tablet is docked, an example USB HID unlock device may be connected and/or available to the tablet for communication. In order to ensure the software on the tablet is correctly identifying, detecting and/or targeting the appropriate USB device, USB descriptor values (in HEX) may be specified. In an embodiment, an example format may be utilized, in whole or in part:

Vendor ID (VID): 0xXXXX

Product ID (PID): 0xXXXX

PUBLIC KEY FORMAT. An example public key may comprise 128 bits or 16 bits, for example, although examples are not limited in scope in this respect. Such a public key may be communicated via two HID 8-byte packet transfers, for example. An example format follows:

| HID 0 Byte 15 | HID 1 Byte 14 | HID 2 Byte 13 | HID 3 Byte 12 | HID 4 Byte 11 | HID 5 Byte 10 | HID 6 Byte 9 | HID 7 Byte 8 |
|---|---|---|---|---|---|---|---|
| HID 0 Byte 7 | HID 1 Byte 6 | HID 2 Byte 5 | HID 3 Byte 4 | HID 4 Byte 3 | HID 5 Byte 2 | HID 6 Byte 1 | HID 7 Byte 0 |

CREATING PUBLIC ENCRYPTION KEY. An example public encryption key may be created as a random or pseudo-random 128-bit number, for example. Some valid ways of creating it, would be to grab a running timer value and/or to call a rand( ) function if it were to be available, for example, Command Structures Unlock The unlock command may be specified, and/or may have the following structure:

| Byte 7 | Byte 6 | Byte 5 | Byte 4 | Byte 3 | Byte 2 | Byte 1 | Byte 0 |
|---|---|---|---|---|---|---|---|
| Response Type: Status | | | | May be used, in whole or in part, to request disengagement of the RapidDoc system. | | | |

ETHERNET RESET. An example reset command may be specified, and/or may include the following example structure.

| Byte 7 | Byte 6 | Byte 5 | Byte 4 | Byte 3 | Byte 2 | Byte 1 | Byte 0 |
|---|---|---|---|---|---|---|---|
| Response Type: Status | | | | May be used, in whole or in part, to reset the Ethernet circuitry to cycle the connection. | | | |

HEARTBEAT. An example heartbeat command may be specified, and/or may have the following example structure:

| Byte 7 | Byte 6 | Byte 5 | Byte 4 | Byte 3 | Byte 2 | Byte 1 | Byte 0 |
|---|---|---|---|---|---|---|---|
| Response Type: Status | | | | May be used, in whole or in part, to let the firmware know that a connection is alive. | | | |

BATTERY CHARGE ON. An example battery charge command may be specified, and/or may have the following example structure:

| Byte 7 | Byte 6 | Byte 5 | Byte 4 | Byte 3 | Byte 2 | Byte 1 | Byte 0 |
|---|---|---|---|---|---|---|---|
| Response Type: Status | | | | | May used, in whole or in part, to enable the battery charge circuitry. | | |

BATTERY CHARGE OFF. An example battery charge off command may be specified, and/or may have the following example structure:

| Byte 7 | Byte 6 | Byte 5 | Byte 4 | Byte 3 | Byte 2 | Byte 1 | Byte 0 |
|---|---|---|---|---|---|---|---|
| Response Type: Status | | | | | May be used, in whole or in part, to disable the battery charge circuitry. | | |

GET SERIAL NUMBER. An example get serial number command may be specified, and/or may have the following example structure.

| Byte 7 | Byte 6 | Byte 5 | Byte 4 | Byte 3 | Byte 2 | Byte 1 | Byte 0 |
|---|---|---|---|---|---|---|---|
| Response Type: Content, 16 bytes | | | | | It may be used, in whole or in part, to request the serial number | | |

PROGRAM START. An example program start command may be specified, and/or may have the following example structure:

| Byte 7 | Byte 6 | Byte 5 | Byte 4 | Byte 3 | Byte 2 | Byte 1 | Byte 0 |
|---|---|---|---|---|---|---|---|
| Response Type: Status | | | | | May be used, in whole or in part, to get the microcontroller ready for a firmware update. | | |

BC = Block Count, the number of packets that will be sent
CS = Checksum, checksum of the entire file being sent PROGRAM PACKET. An example program packet command may be specified, and/or may have the following example structure:

| Byte 7 | Byte 6 | Byte 5 | Byte 4 | Byte 3 | Byte 2 | Byte 1 | Byte 0 |
|---|---|---|---|---|---|---|---|
| Response Type: Status | | | | | May be used, in whole or in part, to send one packet of a firmware update. | | |

BC = Block Count, the current packet being sent
CS = Checksum, checksum of the entire file being sent
D = Content, part of the file being sent over to be used for the firmware update PROGRAM ABORT. An example program abort command may be specified, and/or may have the following example structure:

| Byte 7 | Byte 6 | Byte 5 | Byte 4 | Byte 3 | Byte 2 | Byte 1 | Byte 0 |
|---|---|---|---|---|---|---|---|
| Response Type: Status | | | | May be used, in whole or in part, to cancel a firmware update. | | | |

PROGRAM SWITCH. An example program switch command may be specified, and/or may have the following example structure:

| Byte 7 | Byte 6 | Byte 5 | Byte 4 | Byte 3 | Byte 2 | Byte 1 | Byte 0 |
|---|---|---|---|---|---|---|---|
| Response Type: Status | | | | May be used, in whole or in part, to enable a new firmware update that had been previously downloaded. | | | |

Example RESPONSE STRUCTURES. STATUS. An example status response may have the following example structure:

| Byte 7 | Byte 6 | Byte 5 | Byte 4 | Byte 3 | Byte 2 | Byte 1 | Byte 0 |
|---|---|---|---|---|---|---|---|
| 0xXX | 0xXX | 0xXX | 0xXX | 0xXX | 0xXX | 0xXX | 0xXX |

Byte 0 may have the status information in the following format:

| Bit 7 | Bit 6 | Bit 5 | Bit 4 | Bit 3 | Bit 2 | Bit 1 | Bit 0 |
|---|---|---|---|---|---|---|---|
| Reserved | Reserved | PS | PC | PR | BCS | ES | OHP |

CONTENT. An example content response may have the following example structure:

| Byte 7 | Byte 6 | Byte 5 | Byte 4 | Byte 3 | Byte 2 | Byte 1 | Byte 0 |
|---|---|---|---|---|---|---|---|
| 0xDD | TB | B | RP | D[3] | D[2] | D[1] | D[0] |

This response is repeated with the next piece of content until RP=0:
TB=Total Bytes, the total number of bytes in the content response
B=Bytes, the number of bytes in the current packet
RP=Remaining Packets, the number of messages still remaining to be sent
D=Content, the content being sent As an example, if a content request specifies 16 bytes to respond, there may be four content response packets (16 total bytes/4 content bytes=4 response packets), in an embodiment.

The following represents an example request to unlock an enclosure from a dock. In an embodiment, an application may call a randomizing function, and, for this example, may receive 0x1122334455667788887766554433221. This becomes the public key, for the present example. Also, for example, the application may send the upper 8 bytes to the device via HID. The application may then send the lower 8 bytes to the device via HID, for example. The application may wait to receive two HID packets from the device, with the upper 8 bytes in the first received packet, in an embodiment. The application may use the Speck decrypt function using the public key to determine the private key it received from the device (ex: 0x5555444433332222111110000999998888). The application may use the Speck encrypt function using the private key it received to encrypt the Unlock Command, in an embodiment. The application may send the encrypted command to the device, and the device may perform the unlock procedure and then may respond with a status message giving overall device status.

While the invention has been described above in relation to its example embodiments, various modifications may be made thereto that still fall within the invention's scope. Such modifications to the invention will be recognizable upon review of the teachings herein.

What is claimed is:
1. An apparatus comprising:
a docking system adapted to dock with a computing device, wherein the docking system comprises:
a base;
an enclosure for receiving the computing device, wherein the enclosure includes (1) a case mount for detachably docking with the base and (2) an interface configured to connect with the computing device; and
a circuit configured to, in response to a connection of the computing device with the interface, communicate with the computing device via a communication channel that includes the interface;
wherein a portion of the circuit is resident in the base and a portion of the circuit is resident in the enclosure;
wherein the case mount and the base comprise a plurality of contacts that engage with each other in response to a docking between the case mount and the base; and
wherein engagement between the case mount contacts and the base contacts provide an electrical connection between the interface and the circuit portion that is resident in the base, wherein the communication channel further includes the electrical connection between the case mount contacts and the base contacts;
wherein the enclosure circuit portion is configured to (1) receive data from the computing device via the communication channel, wherein the received data comprises credential data about a user of the computing device, and (2) communicate the received data to the base circuit portion via the electrical connection between the case mount contacts and the base contacts;
wherein the base circuit portion is configured to (1) receive the credential data from the enclosure circuit portion via the electrical connection between the case mount contacts and the base contacts, and (2) control the docking system to permit an undocking of the case mount from the base based on the credential data received from the enclosure circuit portion; and
wherein the credential data comprises at least one of (1) a code from a touchscreen of the computing device, (2) fingerprint data from a fingerprint sensor of the com- puting device, (3) facial recognition data from a camera of the computing device; and/or (4) retina data from a retina scanner of the computing device.

2. The apparatus of claim 1 wherein the interface comprises a connection with an audio port of the computing device.

3. The apparatus of claim 2 wherein the enclosure circuit portion includes a demodulation circuit, the demodulation circuit configured to demodulate a modulated signal received from the computing device via the communication channel in order to extract the credential data from the modulated signal.

4. The apparatus of claim 3 wherein the modulated signal is modulated according to frequency shift keying.

5. The apparatus of claim 3 wherein the enclosure circuit portion further includes a modulation circuit, the modulation circuit configured to modulate data onto a modulated signal to be sent to the computing device via the communication channel.

6. The apparatus of claim 1 wherein the interface comprises a USB interface, and wherein the base circuit portion includes a USB device base, the USB device configured to interpret the received data according to a USB protocol.

7. The apparatus of claim 1 wherein the enclosure comprises a frame connected to the case mount, the frame, the frame adapted to hold the computing device.

8. The apparatus of claim 1 wherein the enclosure is adapted to be detachably docked with the base at any of a plurality of orientations.

9. The apparatus of claim 1 wherein the interface provides a wired connection with the computing device.

10. The apparatus of claim 1 wherein the computing device is wirelessly connectable to a wireless network, and wherein the circuit, in response to the connection of the computing device with the interface, is further configured to communicate with the wireless network via a communication channel that includes the interface and the computing device.

11. The apparatus of claim 10 wherein the circuit, in response to the connection of the computing device with the interface, is further configured to send data to a remote computer system via the communication channel and the wireless network.

12. The apparatus of claim 11 wherein the sent data comprises at least one of:
  status data about at least one of the docking station and the computing device;
  location data about an identifier for the computing device; and/or
  registration data that pairs the docking station with an identifier for the computing device.

13. The apparatus of claim 10 wherein the circuit, in response to the connection of the computing device with the interface, is further configured to receive data from a remote computer system is the communication channel and the wireless network.

14. The apparatus of claim 13 wherein the circuit is further configured to control the docking system based on the received data from the remote computer system.

15. The apparatus of claim 14 wherein the received data comprises an unlock command and/or a lock command.

16. The apparatus of claim 1 wherein the received data further comprises an unlock command with the credential data, and wherein the circuit is further configured to unlock the docking system in response to the received unlock command if the credential data is authorized E s the authorization operation to allow the computing device to be undocked from the docking system.

17. The apparatus of claim 1 wherein the received data further comprises a lock command, and wherein the circuit is further configured to lock the docking system in response to the received lock command to prevent the computing device from being undocked from the docking system.

18. The apparatus of claim 1 wherein the circuit is further configured to perform an authorization operation based on the received credential data to control whether the docking system permits the undocking system is to be performed.

19. The apparatus of claim 1 wherein the circuit includes a processor.

20. The apparatus of claim 1 wherein the interface comprises a USB interface.

21. The apparatus of claim 1 wherein the interface comprises a connection with an audio port of the computing device.

22. The apparatus of claim 1 wherein the interface comprises a lightning connection with the computing device.

23. The apparatus of claim 1 further comprising the computing device.

24. The apparatus of claim 1 wherein the enclosure is adapted to receive a tablet computing device as the computing device.

25. The apparatus of claim 24 further comprising software for execution by the tablet computing device, the software configured to provide a graphical user interface (GUI) for interacting with the user to obtain the credential data from the user.

26. The apparatus of claim 25 wherein the tablet computing device includes a touchscreen, wherein the received credential data comprises the code, and wherein the GUI is configured to obtain the code from the user via the touchscreen.

27. The apparatus of claim 25 wherein the tablet computing device includes a fingerprint scanner, wherein the received credential data comprises the fingerprint data, and wherein the GUI is configured interact with the user to obtain the fingerprint data from the user via the fingerprint scanner.

28. The apparatus of claim 25 wherein the tablet computing device includes a camera, wherein the received Credential data comprises the facial recognition data, and wherein the GUI is configured interact with the user to obtain the facial recognition data from the user via the camera.

29. The apparatus of claim 25 wherein the tablet computing device includes a retina scanner, wherein the received credential data comprises the retina data, and wherein the GUI is configured interact with the user to obtain the retina data from the user via the retina scanner.

* * * * *